(12) United States Patent
Hosomizo

(10) Patent No.: US 12,137,191 B2
(45) Date of Patent: *Nov. 5, 2024

(54) COMPUTER-READABLE STORAGE MEDIUM AND METHOD FOR DISPLAYING INFORMATION ABOUT SHEET CHARACTERISTICS

(71) Applicant: Brother Kogyo Kabushiki Kaisha, Nagoya (JP)

(72) Inventor: Yoshito Hosomizo, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,171

(22) Filed: Nov. 6, 2023

(65) Prior Publication Data

US 2024/0073342 A1 Feb. 29, 2024

Related U.S. Application Data

(63) Continuation of application No. 18/154,059, filed on Jan. 13, 2023, now Pat. No. 11,825,027.

(30) Foreign Application Priority Data

Jan. 27, 2022 (JP) .................................. 2022-010644

(51) Int. Cl.
*H04N 1/00* (2006.01)
*H04N 1/23* (2006.01)

(52) U.S. Cl.
CPC ....... *H04N 1/2323* (2013.01); *H04N 1/00482* (2013.01); *H04N 1/0097* (2013.01); *H04N 1/2338* (2013.01); *H04N 1/2392* (2013.01)

(58) Field of Classification Search
None
See application file for complete search history.

(56) References Cited

U.S. PATENT DOCUMENTS 9,471,266 B2 * 10/2016 Anno .................. G06K 15/002
10,402,128 B2 * 9/2019 Yamakawa ........ H04N 1/00665
(Continued)

FOREIGN PATENT DOCUMENTS

JP 2007-011946 A 1/2007

*Primary Examiner* — Henok Shiferaw
(74) *Attorney, Agent, or Firm* — Scully, Scott, Murphy & Presser, PC

(57) ABSTRACT

A non-transitory computer-readable storage medium stores computer-readable instructions executable by a processor of an information processing device. The instructions support a general-purpose printing program incorporated in an operating system of the information processing device. The instructions, when executed by the processor, cause the information processing device to obtain, from a printer, main body information about sheet characteristics for each feed tray of the printer, obtain print settings from the general-purpose printing program, generate, based on the main body information, notification data including sheet information indicating the sheet characteristics for a feed tray set in the print settings, and provide the notification data to the general-purpose printing program, thereby enabling the notification data to be displayed on the print setting screen.

10 Claims, 9 Drawing Sheets

(56) References Cited

U.S. PATENT DOCUMENTS

| | | | | |
|---|---|---|---|---|
| 2014/0185069 A1* | 7/2014 | Seto | ................... | H04N 1/00477 |
| | | | | 358/1.9 |
| 2016/0179439 A1 | 6/2016 | Kanamoto | | |
| 2017/0223211 A1 | 8/2017 | Yamada | | |
| 2020/0036849 A1* | 1/2020 | Kimura | ................. | G06F 3/1205 |
| 2020/0310708 A1* | 10/2020 | Hosomizo | ............. | G06F 3/1208 |
| 2022/0300228 A1 | 9/2022 | Narita | | |
| 2023/0030221 A1 | 2/2023 | Ichikawa | | |
| 2023/0236773 A1* | 7/2023 | Hosomizo | ............. | G06F 3/1204 |
| | | | | 358/1.13 |
| 2023/0236782 A1* | 7/2023 | Narita | ................... | G06F 3/1203 |
| | | | | 358/1.15 |

\* cited by examiner

COMPUTER-READABLE STORAGE MEDIUM AND METHOD FOR DISPLAYING INFORMATION ABOUT SHEET CHARACTERISTICS

REFERENCE TO RELATED APPLICATIONS

This application is a continuation of U.S. patent application Ser. No. 18/154,059 filed on Jan. 13, 2023 that claims priority from Japanese Patent Application No. 2022-010644 filed on Jan. 27, 2022. The entire content of the priority application is incorporated herein by reference.

BACKGROUND ART

Heretofore, technologies to use a printer driver to display information about sheet characteristics obtained from a printer have been known. For instance, a technology has been disclosed in which a host computer with a printer driver incorporated obtains a sheet size notified from a printer, compares the obtained sheet size with a sheet size set in an application program, and when the sheet size notified from the printer is smaller than the sheet size set in the application program, displays a screen showing a relationship between the two sheet sizes.

DESCRIPTION

In recent years, a technology has been put to practical use in which a printer is controlled using a general-purpose printing program incorporated in an OS ("OS" is abbreviation for "Operating System") as a standard program, without using any printer driver. In this technology, when detecting a printer, the OS associates the printer with the OS-standard general-purpose printing program. Thereafter, in response to receipt of a print instruction for the printer, the OS causes the printer to perform printing, using the OS-standard general-purpose printing program without using any printer driver.

However, such a technology has not been known, for an information processing device using the OS-standard general-purpose printing program, as to obtain sheet characteristics from a printer and display information based on the obtained sheet characteristics, in the same manner as the printer driver. Therefore, there is room for improvement in the display technology under an environment where the OS-standard general-purpose printing programs is used.

According to aspects of the present disclosure, a non-transitory computer-readable storage medium is provided, which stores computer-readable instructions that are executable by a processor of an information processing device and compatible with a printer connected with the information processing device. The instructions support a general-purpose printing program incorporated in advance in an operating system of the information processing device. The instructions are configured to, when executed by the processor, cause the information processing device to perform obtaining main body information stored in the printer. The printer has one or more feed trays and stores the main body information indicating sheet characteristics for each of the one or more feed trays. The instructions are further configured to, when executed by the processor, cause the information processing device to perform obtaining print settings from the general-purpose printing program. The general-purpose printing program is configured to handle data for displaying the print setting screen on the display. The print setting screen is configured to accept, as the print settings, specified values set for a plurality of settable items including items of sheet characteristics and an item of feed tray. The instructions are further configured to, when executed by the processor, cause the information processing device to perform generating notification data based on the obtained main body information. The notification data includes sheet information indicating the sheet characteristics for a specified feed tray set in the obtained print settings. The instructions are further configured to, when executed by the processor, cause the information processing device to perform providing the generated notification data to the general-purpose printing program, thereby enabling the notification data to be displayed on the print setting screen.

According to aspects of the present disclosure, further provided is a method implementable on a processor of an information processing device that executes a support program supporting a general-purpose printing program incorporated in advance in an operating system of the information processing device. The support program is compatible with a printer connected with the information processing device. The method includes obtaining main body information stored in the printer. The printer has one or more feed trays and storing the main body information indicating sheet characteristics for each of the one or more feed trays. The method further includes obtaining print settings from the general-purpose printing program. The general-purpose printing program is configured to handle data for displaying the print setting screen on the display. The print setting screen is configured to accept, as the print settings, specified values set for a plurality of settable items including items of sheet characteristics and an item of feed tray. The method further includes generating notification data based on the obtained main body information. The notification data includes sheet information indicating the sheet characteristics for a specified feed tray set in the obtained print settings. The method further includes providing the generated notification data to the general-purpose printing program, thereby enabling the notification data to be displayed on the print setting screen.

Figure 6A:
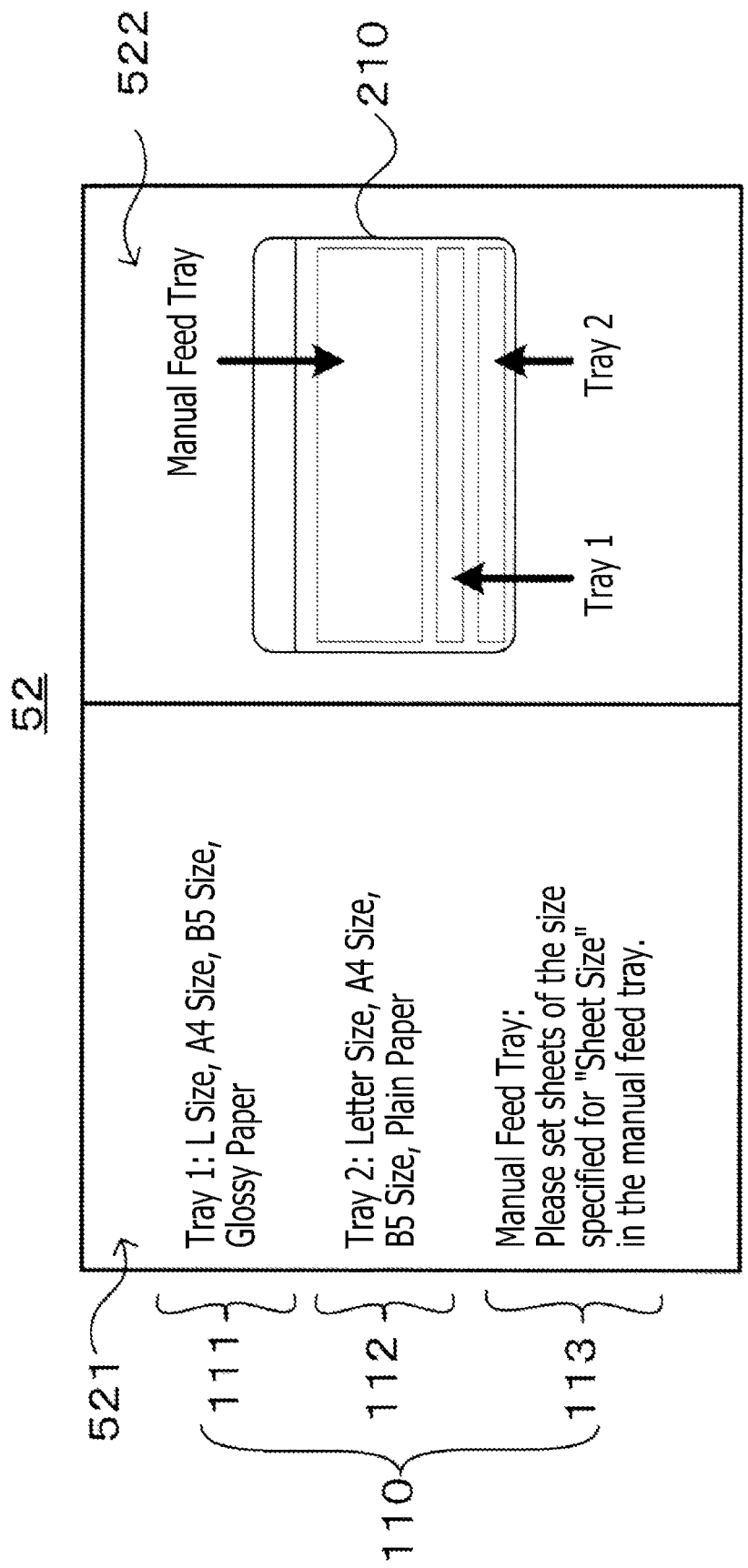
Figure 6B:
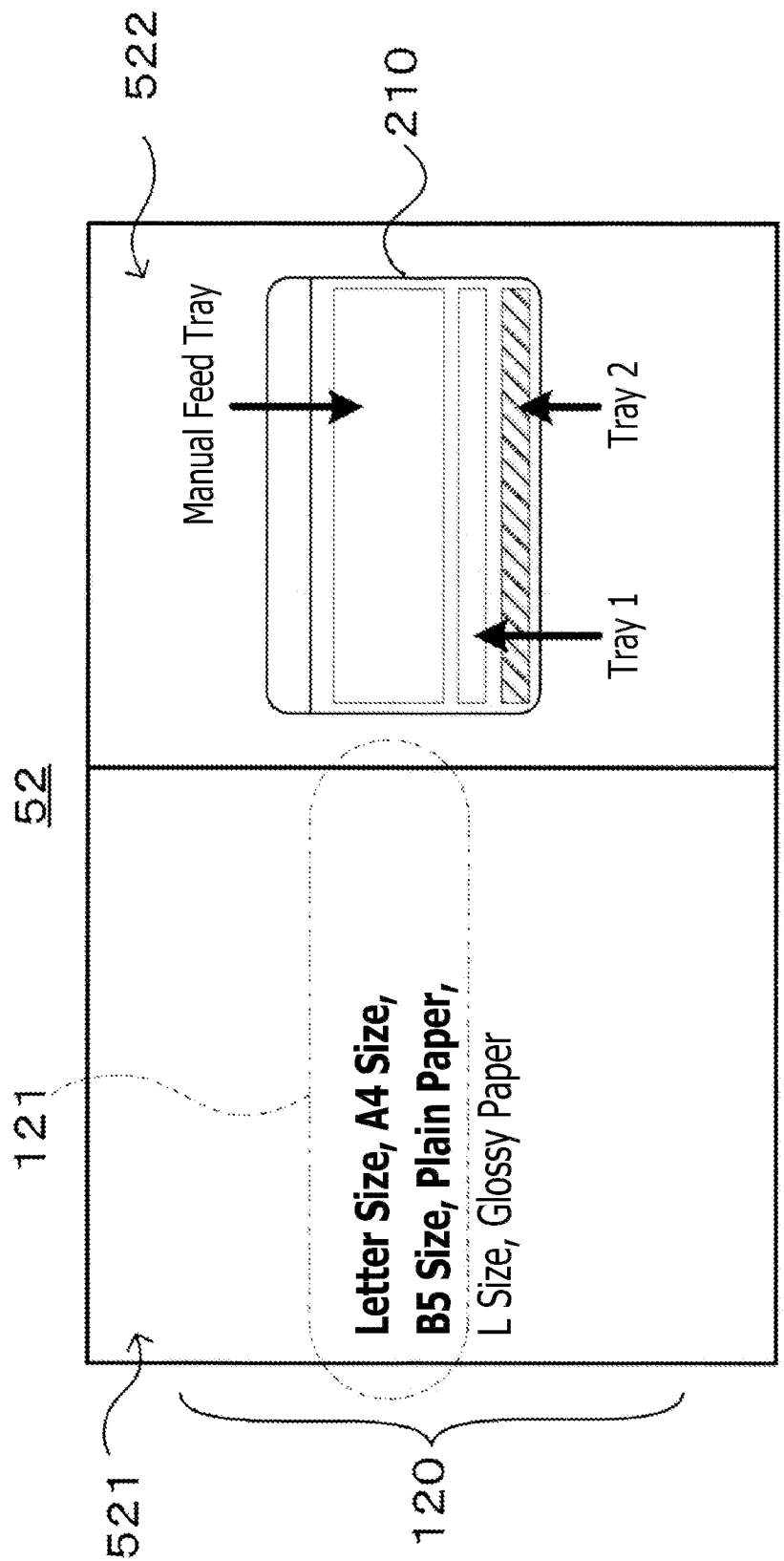
Figure 6C:
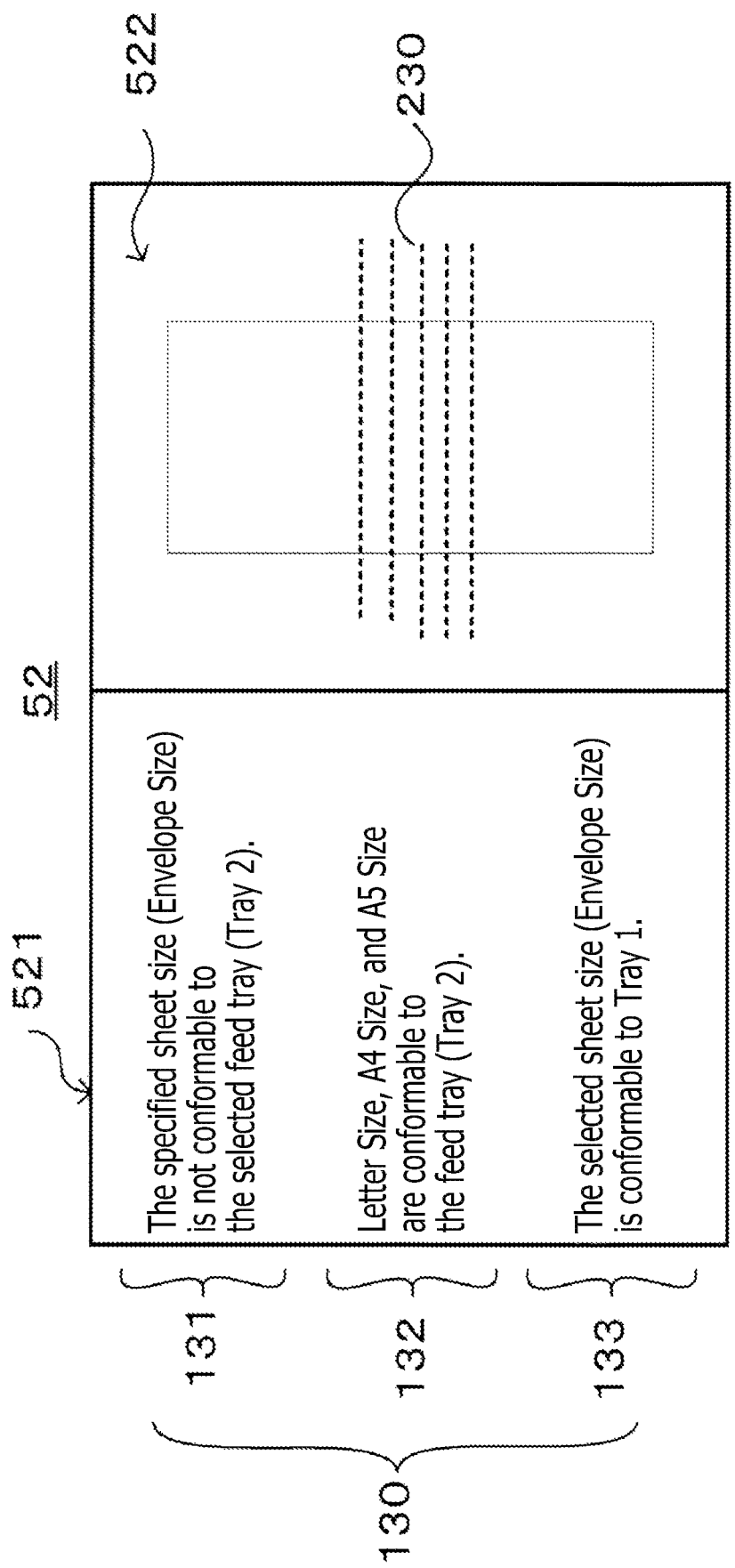

FIGS. 6A, 6B, and 6C show examples of notification data displayed.

Figure 7:
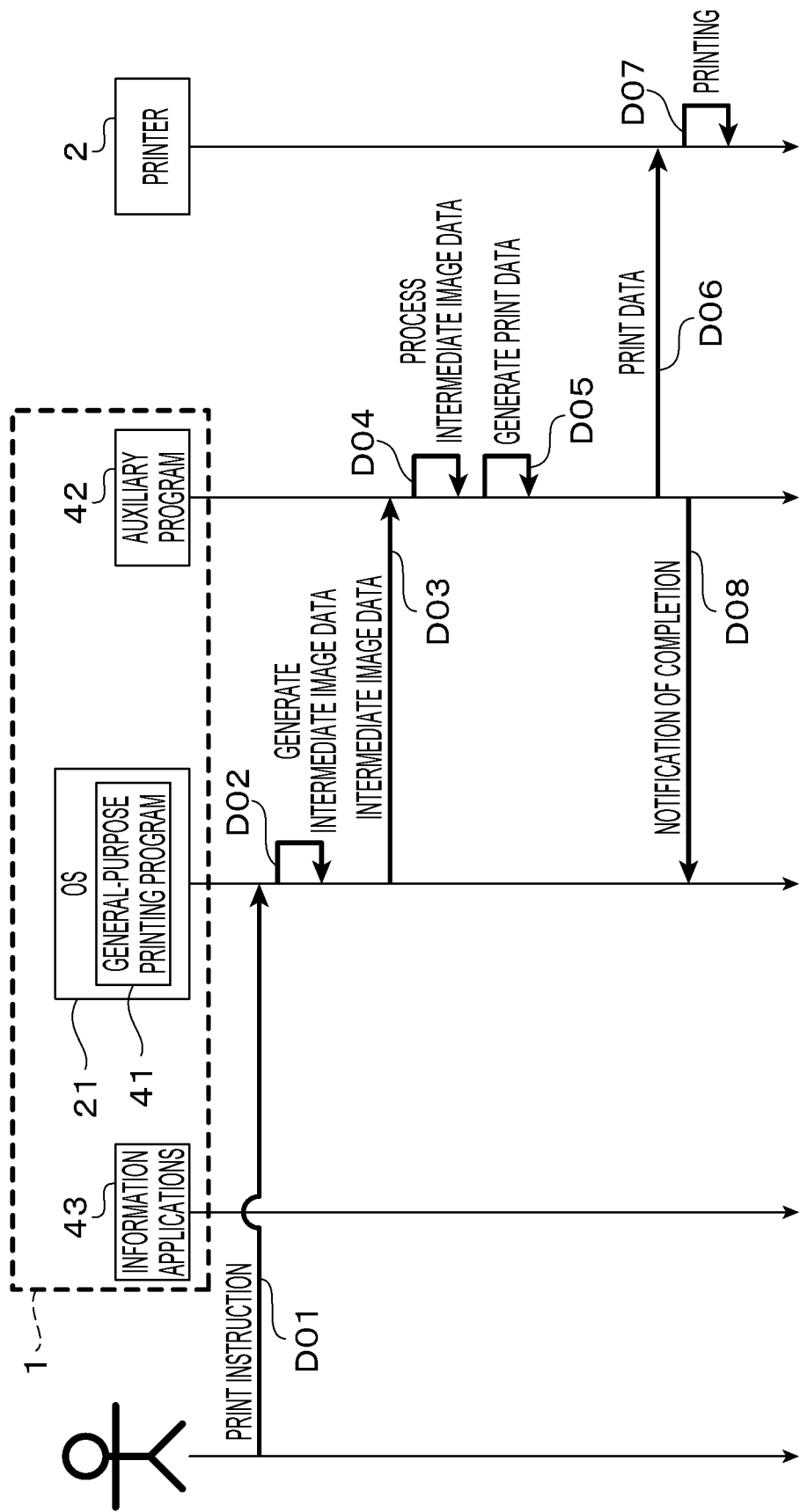

FIG. 7 is a sequence chart showing an example procedure of processes to be performed in response to receipt of a print instruction.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, a personal computer (hereinafter referred to as a "PC") using a support program of an illustrative embodiment according to aspects of the present disclosure will be described with reference to the accompanying drawings.

Figure 1:
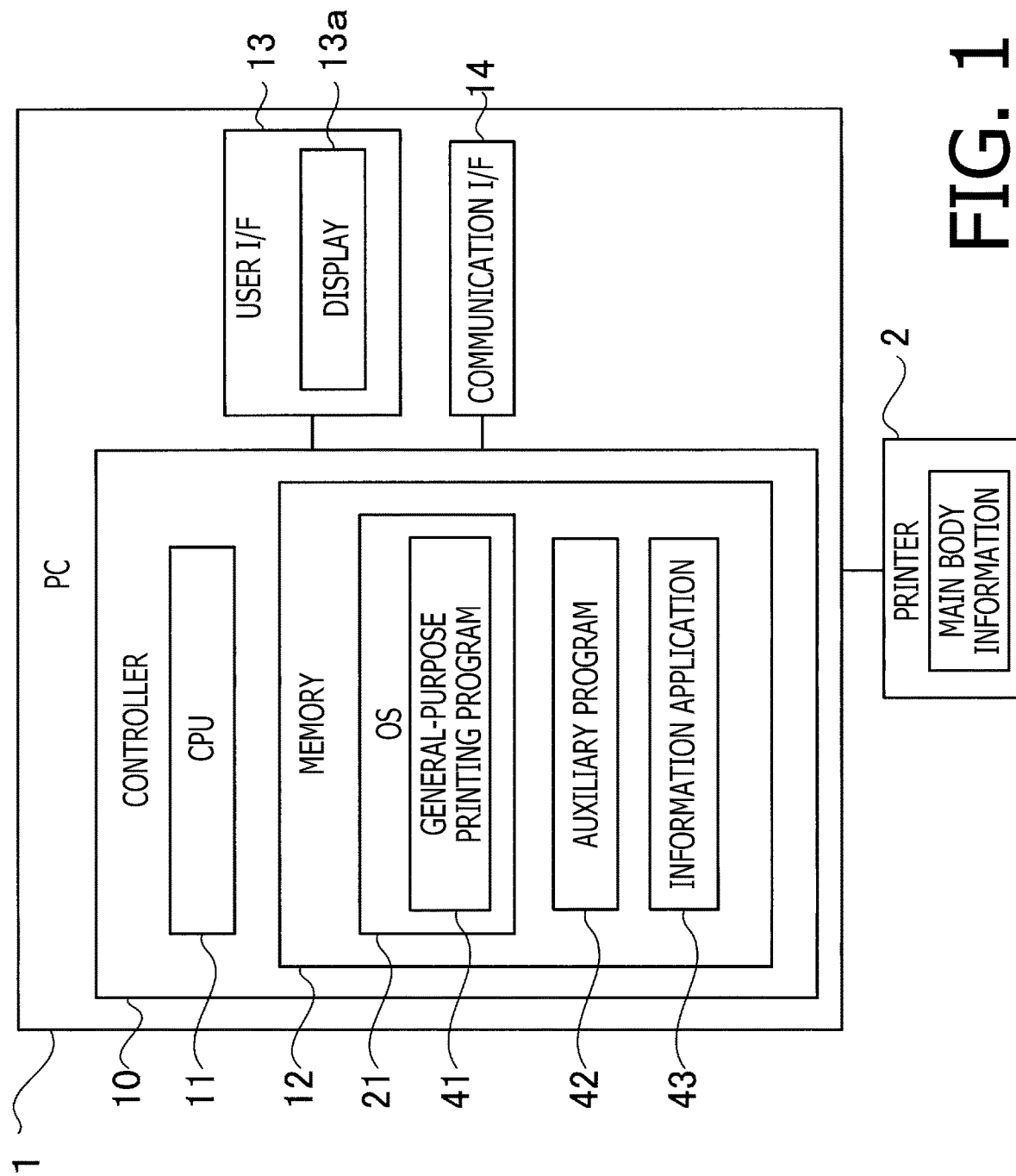
FIG. 1 is a block diagram showing an electrical configuration of a PC.

As shown in FIG. 1, a PC 1 of the illustrative embodiment has a controller 10 that includes a CPU 11 and a memory 12. Further, the PC 1 includes a user interface (hereinafter referred to as a "user I/F") 13 and a communication interface (hereinafter referred to as a "communication I/F") 14, which are electrically connected with the controller 10. It is noted that the "controller 10" shown in FIG. 1 is a generic term as which hardware and software used to control the PC 1 are collectively referred to, and may not necessarily represent a single piece of hardware that actually exists in the PC 1.

The CPU 11 is configured to perform various processes according to programs read from the memory 12 and based on user operations. The memory 12 stores various programs and various types of data. Further, the memory 12 is used as a work area when the CPU 11 performs various processes. A buffer provided to the CPU 11 may be included in examples of the memory 12. The examples of the memory 12 may include, but are not limited to, storage media (e.g., CD-ROMs and DVD-ROMs) that are readable and writable by the CPU 11, as well as a ROM, a RAM, and an HDD incorporated into the PC 1.

The user I/F 13 includes hardware to display a screen for providing information to the user and hardware for accepting user operations. The user I/F 13 may include a display 13a configured to display information, and at least one of input receiving devices (e.g., a mouse, a keyboard, and a touch panel) configured to receive user inputs. For instance, the user I/F 13 may be a combination of the display 13a, the mouse, and the keyboard. In another instance, the user I/F 13 may be a combination of the display 13a and the touch panel.

The communication I/F 14 includes hardware for communication with external devices such as a printer 2. Examples of the communication standards for the communication I/F 14 may include, but are not limited to, Ethernet ("Ethernet" is a registered trademark of Fuji Xerox Co., Ltd.), Wi-Fi ("Wi-Fi" is a registered trademark of the non-profit Wi-Fi Alliance), and USB. The PC 1 may be connectable with the Internet via the communication I/F 14. The PC 1 may include a plurality of communication I/Fs 14 corresponding to a plurality of communication standards.

As shown in FIG. 1, the memory 12 of the PC 1 stores an operating system (hereinafter referred to as an "OS") 21 containing a general-purpose printing program 41, and further stores an auxiliary program 42 and various application programs (hereinafter referred to as "applications"). Examples of the OS 21 may include, but are not limited to, Windows ("Windows" is a registered trademark of Microsoft Corporation), macOS ("macOS" is a registered trademark of Apple Inc.), Linux ("Linux" is a registered trademark of Linus Torvalds), iOS ("iOS" is a registered trademark of Cisco Systems, Inc.), and Android ("Android" is a registered trademark of Google LLC).

The PC 1 of the illustrative embodiment has various applications such as information applications 43 incorporated. For instance, the information applications 43 include a map application, a calendar application, and a browser. The information applications 43 are configured to, when executed by the CPU 11, cause the display 13a to show various types of information in response to user requests. The information applications 43 may not necessarily be configured to cause the information, which the information applications 43 have caused the display 13a to show, to be printed. It is noted that in the following description, "a program, when executed by the CPU 11, causes the PC 1 to perform a specific process" may be simply expressed as "a program performs a specific process" for the sake of explanatory convenience.

The general-purpose printing program 41 is an OS standard program provided with the OS 21. The general-purpose printing program 41 is configured to cause a printer (e.g., the printer 2) to print information displayed on the display 13a by the information applications 43. The general-purpose printing program 41 of the illustrative embodiment includes a function to generate intermediate image data based on image data to be printed. The general-purpose printing program 41 supports functions that are usable in common by a plurality of models of printers provided by various printer vendors. Unlike printer drivers specific to various printers, the general-purpose printing program 41 supports not all of the functions various printers individually have, but supports only general-purpose functions.

The auxiliary program 42 is a program or a group of programs configured to perform processing based on instructions from the OS 1, accompanying the processing by the general-purpose printing program 41. The auxiliary program 42 is for supporting control of the target hardware. The auxiliary program 42 of the illustrative embodiment conforms to the model of the printer 2 connected with the PC 1. For instance, the auxiliary program 42 is invoked from the general-purpose printing program 41 in response to receipt of an instruction to cause the printer 2 to perform printing with the general-purpose printing program 41. The auxiliary program 42 is called, for instance, PSA ("PSA" is an abbreviation for "Print Support Application") or HSA ("HSA" is an abbreviation for "Hardware Support Application").

The auxiliary program 42 may be a combination of a plurality of programs each of which is configured to accept an execution instruction, or may be a single program configured to perform respective different processes according to instructions. The auxiliary program 42 may be a program prepared for each type of printers by the printer vendor. For instance, respective auxiliary programs may be prepared for inkjet printers and for laser printers. Further, an auxiliary program may be prepared not only for each type of printers but also for each model of printers or for each series of an individual model of printers.

For instance, when a new printer is connected with the PC 1, according to the type and/or the model of the connected printer, the OS 21 of the PC 1 may download an appropriate auxiliary program from a server and incorporate the downloaded auxiliary program into the PC 1. The OS 21 stores into the memory 12 identification information of the incorporated auxiliary program in association with printer information of the newly connected printer.

As shown in FIG. 1, the PC 1 of the illustrative embodiment is connected with the printer 2. The printer 2 has at least a printing function and a communication function. The printer 2 is configured to receive print data and print settings from an external device such as the PC 1 and perform printing according to the print settings. Examples of setting items for the print settings may include, but are not limited to, the number of copies, a print orientation, a feed tray, a sheet size, a sheet type, duplex printing, color printing, and borderless printing.

The printer 2 is configured to accept print settings based on the functions of the printer 2. The printer 2 stores main body information that includes information indicating sheet characteristics for each tray. For instance, the printer 2 has two fixed trays and one manual feed tray. For instance, the printer 2 stores, as the main body information, information that "Tray 1" is usable for "A4 Size," "B5 Size," "Envelope Size," "L Size," "Glossy Paper," and "Plain Paper" and that "Tray 2" is usable for "A4 Size," "B5 Size," "Letter Size," and "Plain Paper." Namely, the printer 2 of the illustrative embodiment stores, as the main body information, information that includes all the sheet sizes and sheet types that are conformable to each feed tray. It is noted that "Sheet Size" and "Sheet Type" may be included in examples of the sheet characteristics.

Suppose for instance that the user sets "L Size" for the item "Sheet Size" and "Glossy Paper" for the item "Sheet Type" with respect to "Tray 1," sets "A4 Size" for the item "Sheet Size" and "Plain Paper" for the item "Sheet Type" with respect to "Tray 2," and sets "A4 Size" for the item "Sheet Size" and "Plain Paper" for the item "Sheet Type" with respect to "Manual Feed Tray." In this case, the printer 2 may store, as the main body information, information including only the sheet size and the sheet type set by the user for each feed tray.

Further, for instance, if the printer 2 has sensors to detect the sheet size and the sheet type in each feed tray, the printer 2 may store, as the main body information, information including the sheet size and the sheet type detected by the sensors for each feed tray.

Further, for instance, if the printer 2 is configured to receive one or more additional trays removably attached and has an additional tray attached, the sheet characteristics for the additional tray may be included in the main body information.

The general-purpose printing program 41 is configured to accept print settings via a print setting screen. Items settable via the print setting screen include "Feed Tray"," "Sheet Size," and "Sheet Type." The auxiliary program 42 is configured to cause the display 13a to display a print setting screen (i.e., a detail setting screen) dedicated to the printer 2 separately from the print setting screen displayed via the general-purpose printing program 41, thereby accepting a setting for each print setting item in substantially the same manner as the printer 2.

Figure 2:
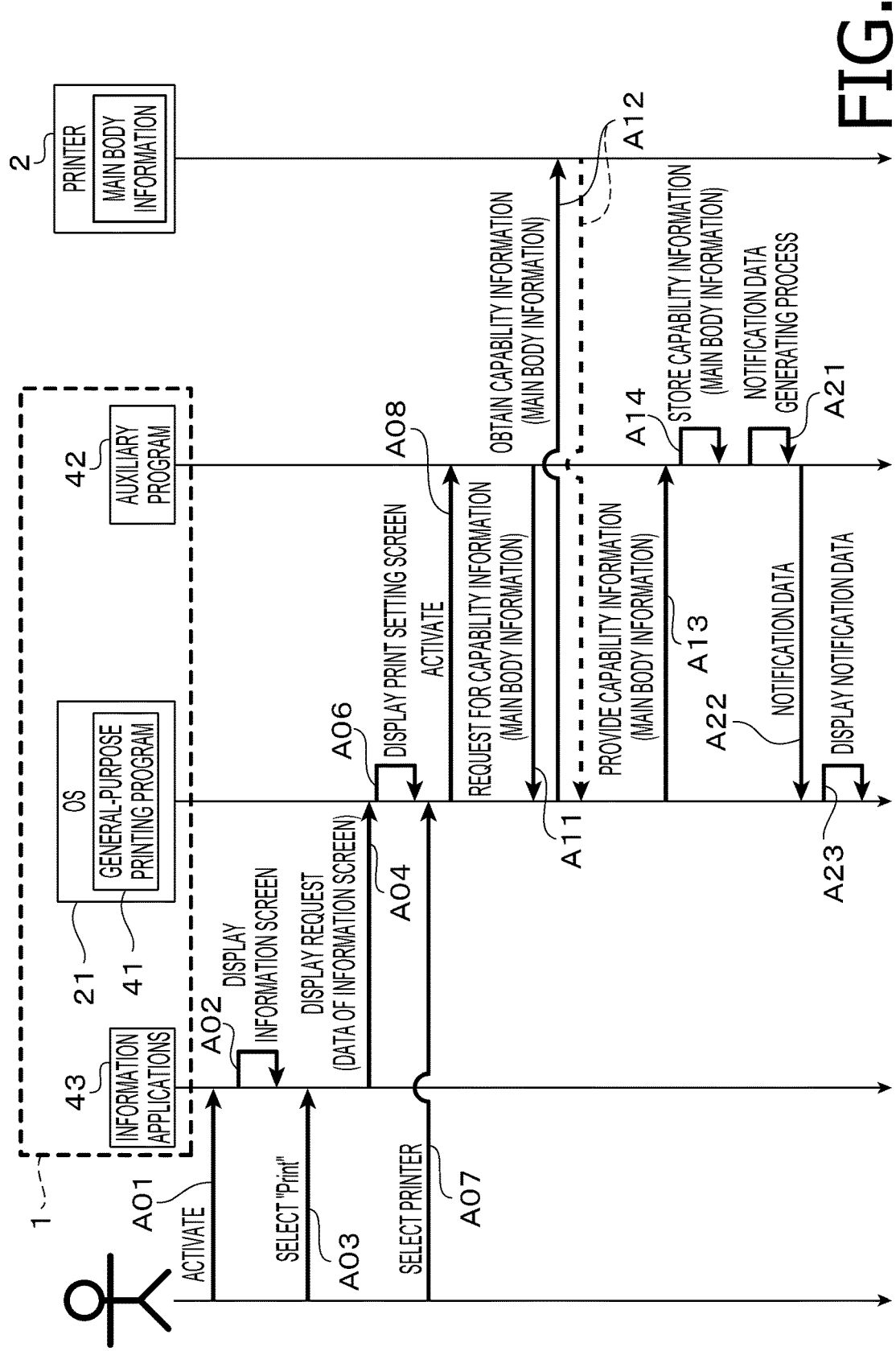
FIG. 2 is a sequence chart showing an example procedure of processes to be performed when "Print" is selected.

Next, referring to a sequence chart shown in FIG. 2, an explanation will be provided of a procedure (i.e., a procedure of printing including the operations by the auxiliary program 42 in the illustrative embodiment) of processes by the individual programs when "Print" is selected via the information applications 43. It is noted that FIG. 2 and after-mentioned other sequence charts indicate operations to be performed when the auxiliary program 42 compatible with the printer 2 is incorporated in the PC 1.

Each processing step in the processes and flowcharts in the illustrative embodiment basically represents a process by the CPU 11 according to instructions described in the programs such as the auxiliary program 42. Processes by the CPU 11 include hardware control using an API ("API" is an abbreviation for "Application Programing Interface") of the OS 21. The following description provides an explanation of operations by each program with a detailed description of the OS 21 omitted. Moreover, "acquisition" and "obtainment" may be used as concepts not requiring any requests.

Figure 3:
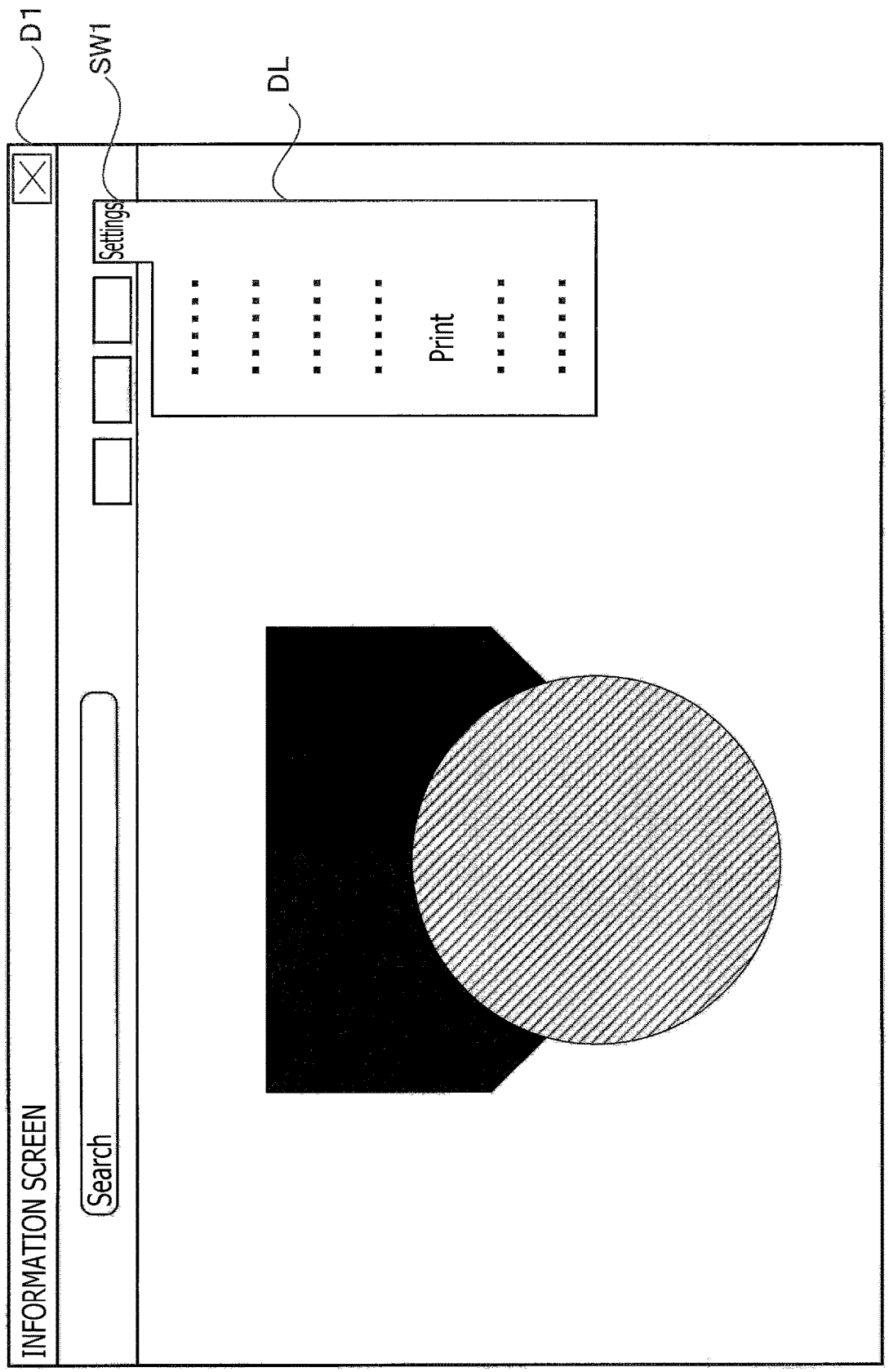
FIG. 3 shows an example of an information screen.

At the beginning of the procedure, the user activates the information applications 43 (A01). The information applications 43 cause the display 13a to display an information screen containing various types of information in response to a user instruction (A02). When the user wishes to print out an image on the information screen, the user selects "Print" on the information screen (A03). For instance, as shown in FIG. 3, an information screen D1 includes a setting button SW1. When the setting button SW1 is pressed by the user, a pull-down menu DL including "Print" is displayed, as shown in FIG. 3. When "Print" in the pull-down menu DL is selected by the user, the information applications 43 sends a display request for the print setting screen and data of the information screen to the general-purpose printing program 41 of the OS 21 (A04).

Figure 4:
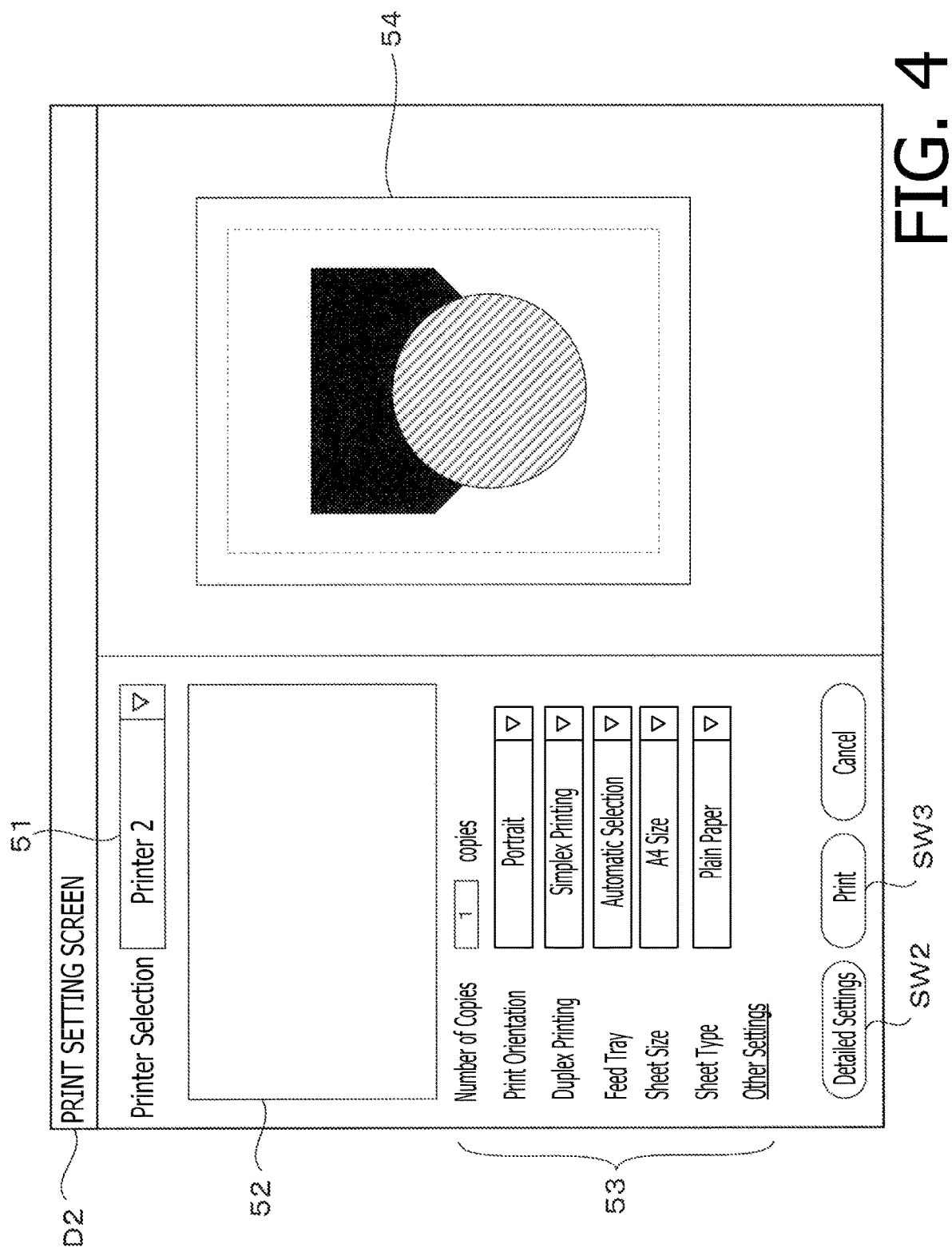
FIG. 4 shows an example of a print setting screen.

The general-purpose printing program 41 displays the print setting screen on the display 13a in response to the display request (A06). The print setting screen is configured to accept an instruction to configure print settings and an instruction to perform printing. For instance, as shown in FIG. 4, a print setting screen D2 includes a printer selection field 51, a notification field 52, a print setting field 53, a preview field 54, a detail setting button SW2, and a print button SW3. The printer selection field 51 is for accepting selection of a printer. The notification field 52 is for displaying a notification image. The print setting field 53 is for accepting designations of various print settings. The preview field 54 is for showing an image of the information screen to be printed. The detail setting button SW2 is for accepting an instruction to configure detailed print settings. The print button SW3 is for accepting an instruction to perform printing.

The print setting field 53 is configured to display print setting items for the functions supported by the general printing program 41 and to accept print setting values set for the print setting items displayed. Examples of items settable via the print setting field 53 may include, but are not limited to, the number of copies, a print orientation, duplex printing, layout printing (Ninl), a sheet size, a feed tray, a print range, a sheet type, color, borderless printing, scaling, and print quality (resolution). In the print setting field 53, to facilitate print settings, only main setting items may be displayed initially, and the other setting items may be additionally displayed in response to operations to "Other Settings" (see FIG. 4). The display in the print setting field 53 may include items specific to the printer 2.

The detail setting button SW2 is configured to, when operated, cause the general-purpose printing program 41 to activate the auxiliary program 42 to accept detailed print settings. In response to receiving a request for configuration of the detailed print settings from the general-purpose printing program 41, the auxiliary program 42 displays a detail setting screen to accept print settings for various functions of the printer 2. The detail setting screen is configured to accept setting values for items of print settings specific to the printer 2. In response to receipt of an instruction to apply print settings via the detail setting screen, the general-purpose printing program 41 receives the print settings configured on the detail setting screen from the auxiliary program 42. The general-purpose printing program 41 displays the print settings received from the auxiliary program 42 in the print setting field 53 on the print setting screen D2. Print setting(s) not displayed on the print settings screen D2 are stored in a memory area for the auxiliary program 42.

The notification image displayed in the notification field 52 is an image indicating what is notified to the user. The general-purpose printing program 41 is enabled to handle data for displaying the print setting screen D2.

As shown in FIG. 2, the user is allowed to select a printer by operating the printer selection field 51 on the print setting screen D2 being displayed (A07). When the selected printer is the printer 2, the general-purpose printing program 41 activates the auxiliary program 42 compatible with the printer 2, and makes a request for processing corresponding to the printer selection (A08). In A08, the general-purpose printing program 41 provides the auxiliary program 42 with information on the selected printer and on the print settings at the time of the printer selection.

When the printer 2 is set as a printer usually used in the OS 21, for instance, as shown in FIG. 4, the general-purpose printing program 41 displays the print setting screen D2 with the printer 2 selected (A06) and activates the auxiliary program 42 (A08). Namely, the printer 2 is automatically selected by the OS 21, and the general-purpose printing program 41 executes A08 based on information on the selected printer 2. In this case, the user operation in A07 is unnecessary.

The information applications 43, instead of the general-purpose printing program 41, may display the print setting screen D2. In that case, the information applications 43 may activate the general-purpose printing program 41 in response to "Print" being selected in A03, then obtain data for displaying the print setting screen D2 from the general-purpose printing program 41, and cause the display 13a to display the print setting screen D2 based on the obtained data. Then, the information applications 43 may provide the information on the selected printer 2 to the general-purpose printing program 41, for instance, in response to the printer 2 being selected already even without the user selection in A07 or selected in A07. Thereby, in A08, the general-purpose printing program 41 may activate the auxiliary program 42 compatible with the printer 2.

The auxiliary program 42, in response to being activated, sends a request for capability information of the printer 2 to the OS 21 (A11). In response to receipt of the request from the auxiliary program 42, the OS 21 sends an obtainment request for the capability information to the printer 2, and obtains the capability information from the printer 2 (A12). The printer 2 incorporates the main body information as well as extended information in an extended area of the capability information, and sends a reply with the capability information including the main body information to the general-purpose printing program 41. The OS 21 obtains the capability information from the printer 2, thereby obtaining the extended information and the main body information included in the capability information from the printer 2. The OS 21 provides the auxiliary program 42 with the capability information, which includes the main body information, obtained from the printer 2 (A13). Namely, the auxiliary program 42 obtains the main body information included in the capability information from the printer 2 via the general-purpose printing program 41.

For instance, the OS 21 communicates with the printer 2 via IPP ("IPP" is an abbreviation for "Internet Printing Protocol") communication. It is noted that instead of sending the request to the OS 21, the auxiliary program 42 may obtain the capability information and the main body information directly from the printer 2, for instance, using MIB ("MIB" is an abbreviation for "Management Information Base"). The auxiliary program 42 may obtain the main body information in a different method from a method for obtaining the capability information.

The main body information obtained from the printer 2 includes information on the trays attached to the printer 2 and information indicating the sheet size and the sheet type that are conformable to each tray. The capability information obtained from the printer 2 includes information on parameters settable for the print settings. Further, the capability information includes information indicating proper combinations of print settings. Further, the capability information includes, for instance, status information, information on the remaining amount of consumable material, information on the trays attached, sheet information on the sheet set for each tray, and information on settable print resolutions. Further, the printer 2 may be configured to perform image processing based on a received print job and perform printing based on the data after the image processing, for instance, to perform intensive printing (e.g., Nin1), composite printing (e.g., watermarking), and saving printing to save colorant. If the printer 2 has image processing functions executable on the printer 2, the printer 2 may provide information on these functions to the OS 21 as the capability information.

The auxiliary program 42 stores the capability information obtained from the OS 21 in A13 in a particular area in the memory 12 that is usable by the auxiliary program 42 (A14). Namely, the auxiliary program 42 stores the main body information included in the capability information in a particular storage area together with other capability information than the main body information. When capability information has already been stored in the memory 12, the auxiliary program 42 overwrites the already-stored capability information to store the capability information obtained this time. Namely, the auxiliary program 42 rewrites the main body information stored, each time the auxiliary program 42 obtains the main body information. Thereby, for instance, even when during a period from the last time the printer 2 was selected until the current time the printer 2 has been selected, the setting for the sheet size or the sheet type has been changed on the printer 2 side, or sheets of a different sheet size or a different sheet type have been put in a feed tray in place of the previous ones, the auxiliary program 42 is enabled to store the main body information reflecting that change in the memory 12.

The auxiliary program 42 performs a notification data generating process based on the main body information included in the capability information obtained in A13 (A21). The notification data generating process is a process to generate notification data indicating a notification image to be displayed in the notification field 52 on the print setting screen D2. The notification image to be displayed in the notification field 52 may include, for instance, a text, a still image, and a video, or may include a combination of at least two selected from a group consisting of texts, still images, and videos. For instance, in the notification data generating process in A21, notification data including a logo of the printer manufacturer and an advertisement may be generated. The notification data may be empty if there is nothing to be displayed in the notification field 52.

Furthermore, the auxiliary program 42 provides the general-purpose printing program 41 with display information including the generated notification data and information on print setting values based on the capability information (A22), and terminates the process of the auxiliary program 42. Based on the display information received from the auxiliary program 42, the general-purpose printing program 41 displays a notification image in the notification field 52 of the print setting screen D2 displayed on the display 13a (A23). In A23, in addition to displaying the notification image based on the notification data in the notification field 52, the general-purpose printing program 41 displays in the print setting field 53 information based on the capability information of the printer 2, as initial values of individual print settings. It is noted that when the information applications 43 are configured to display the print setting screen D2, the information applications 43 execute substantially the same process as A23. Namely, in this case, the information applications 43 receive the notification data and displays the notification image in the notification field 52.

The example in FIG. 4 shows the print setting screen D2 that includes a single notification field 52. However, the location, the shape, the size, and the number of the notification fields 52 are not limited to this example. The auxiliary program 42 may obtain information on the notification field 52 from the general-purpose printing program 41, and may determine, based on the obtained information, the notification data to be displayed in the notification field 52. For instance, if there are a plurality of locations where the notification field 52 may be displayed, and it is possible to specify a display location where the notification field 52 is to be displayed from among the plurality of locations via the auxiliary program 42, the auxiliary program 42 may provide the general-purpose printing program 41 with notification data that includes information specifying the display location. Moreover, if it is possible to select a size of the notification field 52, the auxiliary program 42 may provide the general-purpose printing program 41 with information specifying the selected size of the notification field 52.

Instead of generating notification data and providing the generated notification data to the general-purpose printing program 41, the auxiliary program 42 itself may display the information. However, in this case, a separate screen from the print setting screen D2 would be displayed, and such complicated display might cause stress on the user. Meanwhile, when the information is displayed within the print setting screen D2 of the general-purpose printing program 41 of the OS 21, it is possible to achieve more simplified display and avoid the stress on the user.

Figure 5:
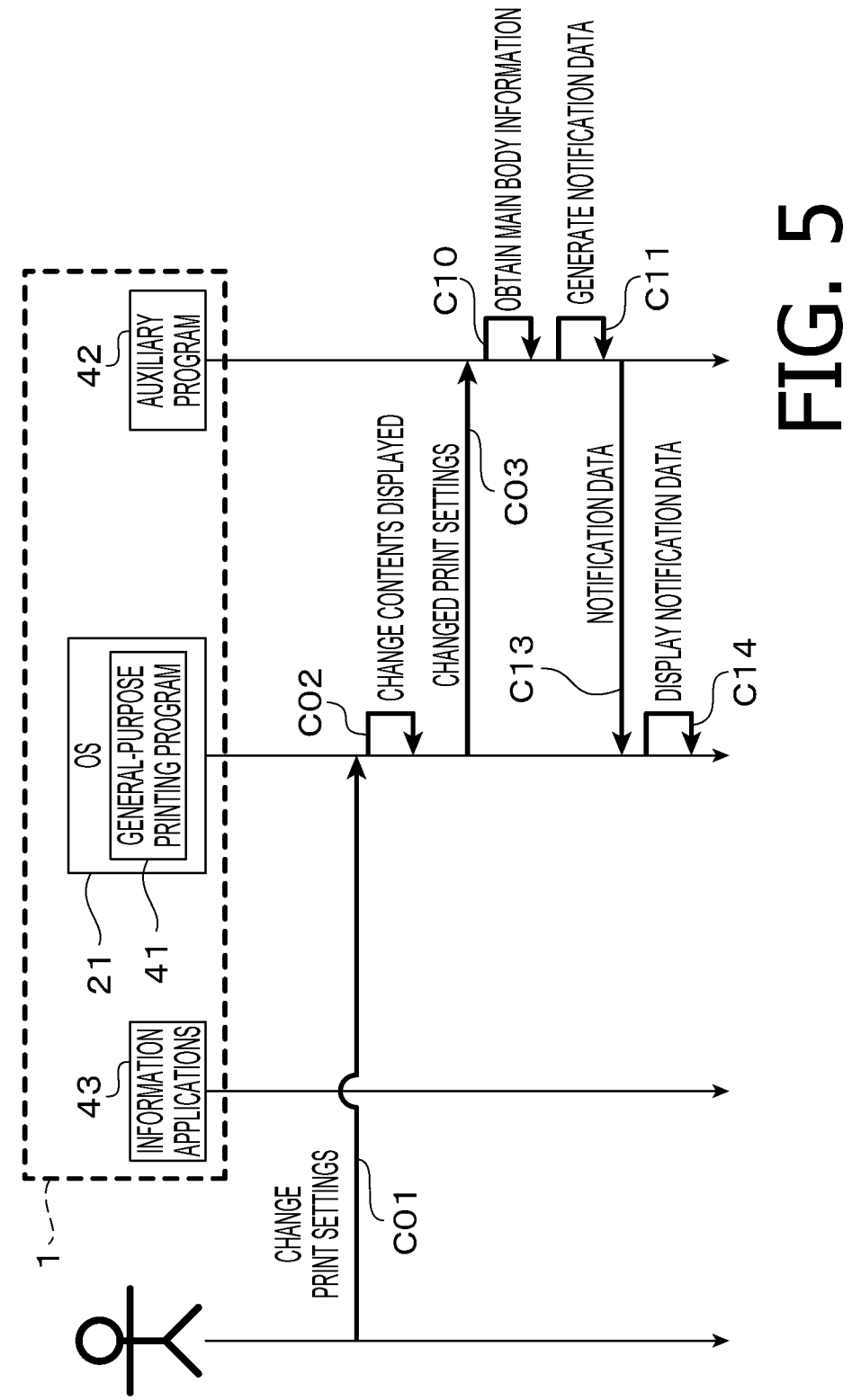
FIG. 5 is a sequence chart showing an example procedure of processes to be performed when print settings are changed.

Next, referring to a sequence chart in FIG. 5, an explanation will be provided of a procedure of processes to be performed by the individual programs when the user operates the print setting field 53 to provide an instruction to change the print settings while the print setting screen D2 (see FIG. 4) is being displayed. As described above, the print setting screen D2 is configured to receive an instruction to change the print settings through a user operation to the print setting field 53 and to receive an instruction to perform printing through a user operation to the print button SW3.

Based on a user instruction to change the print settings (C01), the general-purpose printing program 41 changes the contents displayed in the print setting field 53 on the print setting screen D2 (C02). Furthermore, when the print settings are changed, the general-purpose printing program 41 activates the auxiliary program 42 and makes a request for processing corresponding to the changed print settings to the auxiliary program 42 (C03). In C03, the auxiliary program 42 receives information on the changed print settings from the general-purpose printing program 41.

In C10, the auxiliary program 42 reads out the main body information stored with the capability information in the memory 12 in A14 (see FIG. 2). In C11, the auxiliary program 42 generates notification data based on the read main body information, and the changed print settings received from the general-purpose printing program 41 in C03. In C13, the auxiliary program 42 provides the notification data generated in C11 to the general-purpose printing program 41. In C14, the general-purpose printing program 41 displays the received notification data in the notification field 52 on the print setting screen D2 (see FIG. 4). Namely, an image based on the improper notification data generated by the auxiliary program 42 is displayed on the print setting screen D2 that has been activated and displayed from the information applications 43. Specific explanations of C03 and C10 to C14 will be provided with reference to FIG. 6.

Suppose for instance that the printer 2 has two feed trays "Tray 1" and "Tray 2" and one "Manual Feed Tray" and that the auxiliary program 42 stores in the memory 12 the main body information obtained from the printer 2 that indicates the sheet characteristics for "Tray 1," "Tray 2," and "Manual Feed Tray." For instance, the main body information includes information indicating that the sheet sizes conformable to "Tray 1" are "L Size," "A4 Size," and "B5 Size," that the sheet sizes conformable to "Tray 2" are "Letter Size," "A4 Size," and "B5 Size," that the sheet types conformable to "Tray 1" are "Glossy Paper" and "Plain Paper," and that the sheet type conformable to "Tray 2" is only "Plain Paper."

Suppose for instance that a parameter for one of the items has been changed in the print setting field 53 on the print setting screen D2 (see FIG. 4) displayed on the display 13a by the general-purpose printing program 41 in a state where the main body information is stored in the memory 12 by the auxiliary program 42. The general-purpose printing program 41 provides the auxiliary program 42 with the print settings changed in the print setting field 53 (C03 in FIG. 5). The changed print settings include not only the changed parameter for the above item but also unchanged parameters for the other items.

For instance, when the parameter set for "Feed Tray" in the changed print settings received by the auxiliary program 42 from the general-purpose printing program 41 is "Automatic Selection," the auxiliary program 42 reads from the memory 12 information indicating the sheet size and the sheet type for each of all the feed trays in the main body information (C10 in FIG. 5), and generates notification data (C11 in FIG. 5).

When "Automatic Selection" is set for "Feed Tray" in the changed print settings, a sheet feeding source when printing is performed depends on the settings or specifications of the printer 2. Therefore, the auxiliary program 42 generates the notification data that includes text information describing the sheet sizes and the sheet types that are conformable to each of all the sheet trays of the printer 2. The notification data may include image data. The auxiliary program 42 provides the generated notification data to the general-purpose printing program 41, thereby enabling the text information and the image data included in the notification data to be displayed in the notification field 52 on the print setting screen D2 (C13 in FIG. 5).

For instance, as shown in FIG. 6A, the notification field 52 has a first display area 521 for displaying the text information and a second display area 522 for displaying the image data. In the first display area 521, for instance, text information 110 included in the notification data is displayed.

As shown with the reference numerals 111, 112, and 113 in FIG. 6A, the text information 110 includes a description about the sheet sizes and the sheet types that are conformable to each tray. As shown with the reference numerals 111 and 112 in FIG. 6A, information based on the main body information is displayed for "Tray 1" and "Tray 2." With respect to "Manual Feed Tray," it is not possible to specify the sheet sizes and the sheet types that are conformable that tray from the main body information. Therefore, as shown with the reference numeral 113 in FIG. 6A, the auxiliary program 42 enables a predetermined description for "Manual Feed Tray" to be displayed in the notification field 52. The manual feed tray may be an example of a "particular tray" according to aspects of the present disclosure. The particular tray may be a tray configured to be removably attached to a printer.

The image data included in the notification data is displayed in the second display area 522. For instance, in the second display area 522, image data 210 indicating respective positions of "Tray 1," "Tray 2," and "Manual Feed Tray" of the printer 2 is displayed.

The user who sees the notification field 52 is allowed to know all of the sheet sizes and the sheet types that are usable for printing by the printer 2. In the notification field 52, separate information about the sheet sizes and the sheet types that are conformable to each feed tray is displayed in a manner distinguishable for each feed tray. Therefore, the user is allowed to easily grasp the sheet sizes and the sheet types that are conformable to the feed tray set via the print setting screen D2. In addition, as shown with the reference numeral 113 in FIG. 6A, the auxiliary program 42 enables the predetermined description for "Manual Feed Tray" to be displayed in the notification field 52. Thus, it is possible to provide an appropriate notification about the manual feed tray to the user.

When not "Automatic Selection" but a selected one of "Tray 1," "Tray 2," and "Manual Feed Tray" is set for the item "Feed Tray" on the print setting screen D2, only the information about the selected tray may be displayed. For instance, when "Tray 2" is set for "Feed Tray" on the print setting screen D2, the auxiliary program 42 may generate notification data including only the information shown with the reference numeral 112 and provide the generated notification data to the general-purpose printing program 41, thereby enabling the generated notification data to be displayed in the first display area 521. Thereby, the user is allowed to easily grasp the sheet sizes and the sheet types that are conformable to the feed tray selected via the print setting screen D2.

On the other hand, for instance, even when "Tray 2" is set for "Feed Tray" on the print setting screen D2, the sheet sizes and the sheet types that are conformable to each of all the trays may be displayed in the notification field 52, as shown in FIG. 6A. Namely, information about not only the selected tray "Tray 2" but also the unselected trays "Tray 1" and "Manual Feed Tray" may be displayed in the notification field 52. Thereby, the user is allowed to know the sheet sizes and the sheet types that are conformable to each of all the trays provided to the selected printer 2. As a result, the user is allowed to easily configure the print settings with a proper combination of a feed tray, a sheet size, and a sheet type.

For instance, as shown in FIG. 6B, in the first display area 521 of the notification field 52, the sheet sizes and the sheet types that are usable for the printer 2 may be listed without being distinguished for each tray. For instance, when "Tray 2" is set for "Feed Tray" in the changed print settings, the sheet characteristics for the selected "Tray 2" may be preferentially displayed with higher priority than the sheet characteristics for the unselected trays, as shown with the reference numeral 121 in FIG. 6B. Examples of the preferentially displaying method may include, but are not limited to, changing an arrangement order of the listed information in such a manner that the sheet sizes and the sheet types that are conformable to "Tray 2" are displayed ahead of the other information in the listed information, and highlighting the sheet sizes and the sheet types that are conformable to "Tray 2" with a larger font than the other information.

The preferentially displaying method may be either displaying higher-priority information ahead of lower-priority information in the arrangement order or highlighting the higher-priority information. Another example of the preferentially displaying method may be displaying the information indicating the sheet sizes and the sheet types that are conformable to the selected tray "Tray 2" earlier than the information for the unselected tray "Tray 1," when the information indicating the sheet sizes and the sheet types that are conformable to each tray is displayed by switching from the information for one tray to the information for another tray.

Thus, by displaying the sheet sizes and the sheet types that are conformable to the selected feed tray "Tray 2" in preference to the sheet sizes and the sheet types that are conformable to the unselected feed tray "Tray 1," the user is allowed to easily recognize from the display in the notification field 52 whether there are improper settings in the current print settings on the print settings screen D.

In the meantime, the general-purpose printing program 41 is a printing program that is incorporated in advance in the OS 21 and is different from the printer driver and the auxiliary programs 42 that is compatible with each printer model. Therefore, the general-purpose printing program 41 does not have information about the correspondence between each feed tray and the sheet characteristics. The print setting screen D2, displayed on the display 13a by the general-purpose printing program 41, might accept print settings containing an improper combination of parameters which the printer 2 is not allowed to accept.

Suppose for instance that "Envelope Size" is conformable to "Tray 1" but not to "Tray 2." In this case, the auxiliary program 42 stores in the memory 12 the main body information in which "Envelope Size" is included in the sheet sizes conformable to "Tray 1" and not included in the sheet sizes conformable to "Tray 2." In this state, there may be a case in which the general-purpose printing program 41 accepts, via the print setting screen D2, print settings changed by setting "Tray 2" for "Feed Tray" and setting "Envelope Size" for "Tray 2." The general-purpose printing program 41 provides the auxiliary program 42 with the changed print settings including "Tray 2" and "Envelope Size."

As described above, in the main body information stored in the memory 12, "Envelope Size" is not included in the sheet sizes conformable to "Tray 2." From the main body information, the auxiliary program 42 recognizes that the sheet size "Envelope Size" included in the changed print settings is not a sheet size conformable to the feed tray "Tray 2" included in the changed print settings. Therefore, the auxiliary program 42 generates notification data including text information describing a sheet size error and image data, and provides the generated notification data to the general-purpose printing program 41, thereby enabling the notification data to be displayed in the notification field 52 on the print setting screen D2.

For instance, as shown in FIG. 6C, error information 130 indicating a sheet characteristics error is displayed in the first display area 521 of the notification field 52. The error information 130 includes, for example, first information 131 describing a sheet size mismatch, second information 132 describing the sheet sizes conformable to the feed tray set via the print setting screen D2, and third information describing the feed trays conforming to the sheet size set via the print setting screen D2. The error information 130 may include only one of the first to third information 131 to 133, or may include other information. In the second display area 522, image data 230 is displayed that represents an image of an error at an attempt to perform printing with the specified envelope size.

According to the above configuration, it is expected that before inputting a print instruction by operating the print button SW3 on the print setting screen D2, the user will learn, from the error information 130 and the image data 230 displayed in the notification field 52, that the combination of the feed tray and the sheet size set on the print setting screen D2 is improper for the selected printer 2, and will change the print settings to be proper. In particular, the user is allowed to specifically learn how to settle the error from the second information 132 and the third information 133 and therefore to easily change the print settings to be acceptable with a proper combination of a feed tray and a sheet size on the print setting screen D2.

The sheet size mismatch has been described above with reference to FIG. 6C. With respect to a sheet type mismatch as well, the auxiliary program 42 may generate notification data including error information indicating the sheet type mismatch and provide the generated notification data to the general-purpose printing program 41, thereby enabling the notification data to be displayed in the notification field 52.

Next, referring to a sequence chart shown in FIG. 7, an explanation will be provided of a procedure of processes by the individual programs when a print instruction through a user operation to the print button SW3 is received while the print setting screen D2 (see FIG. 4) is being displayed. The user's print instruction to execute printing may be input directly into the general-purpose printing program 41, or may be input into the information applications 43 and then output from the information applications 43 to the general-purpose printing program 41.

When having received the user's print instruction (D01), the general-purpose printing program 41 generates intermediate image data by converting the format of image data representing a target image to be printed into a format for the intermediate image data using the print settings accepted via the print settings screen D2 (D02), and then provides the generated intermediate image data to the auxiliary program 42 (D03). Various types of image data are included in the information applications 43. The general-purpose printing program 41 converts the image data to be printed into the intermediate image data suitable for generation of print data. If the image data to be printed is suitable for generation of print data, the generation of the intermediate image data may be omitted, and the image data to be printed may be used as is as the intermediate image data. The intermediate image data is, for instance, XPS ("XPS" is an abbreviation for "XML Paper Specification") data.

The auxiliary program 42 processes the intermediate image data received in D03 in such a manner that the intermediate image data reflects the print settings as configured (D04). For instance, when poster printing (1 in 2×2) is set, the auxiliary program 42 divides the image data to be printed into two parts in the vertical and horizontal directions and generates divisional image data.

The auxiliary program 42 rasterizes the processed intermediate image data and generates print data representing the target image to be printed (D05). The print data generated in D05 is data in a format usable for printing by the printer 2. For instance, the print data generated in D05 is PDL data dedicated to the model of the printer 2.

The auxiliary program 42 compatible with the printer 2 is enabled to perform the rasterization with a higher degree of freedom than the general-purpose printing program 41. Therefore, it is more likely that print data suitable for printing with the printer 2 will be generated through the rasterization by the auxiliary program 42. The print data generated by the auxiliary program 42 may be in a format usable for printing with printers other than the model of the printer 2.

The auxiliary program 42 transmits the print data generated in D05 to the printer 2 together with a print command to instruct the printer 2 to perform printing (D06). If there is image processing determined to be executed by the printer 2, the auxiliary program 42 may generate a print command including information regarding the image processing. Further, the auxiliary program 42 may provide a notification that the transmission of the print data has been completed to the general-purpose printing program 41 (D08).

The printer 2, which has received the print data and the print command, performs printing of the image represented by the print data based on the received print command (D07). Thus, a printed material is generated.

Instead of the auxiliary program 42 generating the print data, the general-purpose printing program 41 may generate the print data. For instance, the auxiliary program 42 may provide the intermediate image data processed in D03 and information regarding execution of printing to the general-purpose printing program 41, and the general-purpose printing program 41 may rasterize the intermediate image data and generate the print data. In this case, the general-purpose printing program 41 may provide the generated print data to the auxiliary program 42. In response to receiving the print data from the general-purpose printing program 41, the auxiliary program 42 may transmit the print data received from the general-purpose printing program 41 to the printer 2 together with a print command to instruct the printer 2 to perform printing.

The print data generated by the general-purpose printing program 41 is print data (e.g., PWG-Raster data or PDF data) in a format usable for printing by various types of printers. The rasterization by the general-purpose printing program 41 makes it possible to reduce throughput of the auxiliary program 42, thereby avoiding an increase in processing time, and to reduce a program size of the auxiliary program 42.

The general-purpose printing program 41 may transmit the print data and the print command to the printer 2. Namely, the auxiliary program 42 may provide the generated print data to the general-purpose printing program 41 in such a manner that the print data is transmitted from the PC 1 to the printer 2 as a destination. In this case, the general-purpose printing program 41 may transmit the print data received from the auxiliary program 42 to the printer 2.

As described above, in the PC 1 in which the auxiliary program 42 of the illustrative embodiment is incorporated, the auxiliary program 42 obtains from the printer 2 the main body information about the sheet characteristics that is stored for each feed tray. Then, when the print settings have been changed via the print setting screen D2, the auxiliary program 42 provides the general-purpose printing program 41 with the notification data that includes the sheet information indicating the sheet characteristics for the feed tray set in the changed print settings, thereby enabling the notification data to be displayed on the print setting screen D2. Thereby, the PC 1, which uses the general-purpose printing program 41 of the OS 21, is enabled to notify the user of information about the sheet characteristics suitable for the print settings before a print instruction is input. As a result, the user, who has come to know the information about the sheet characteristics, is more likely to avoid an error due to unsuitable sheet characteristics at an attempt to perform printing.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below.

For instance, the device connected with the PC 1 is not limited to the printer, but may be any device with a printing function, such as a multi-function peripheral, a copier, or a fax machine. The number of printers connected with the PC 1 is not limited to one as illustrated, but may be two or more.

For instance, the main body information may be obtained from the printer 2 not at the time of printer selection, but at the time of installation of the auxiliary program 42 or each time the print settings are changed. The main body information may be obtained at one or more timings selected from the above different timings. In any of the above cases as well, the auxiliary program 42 may store the main body information in the memory 12 and use the stored main body information to generate the notification data. When the main body information is obtained at the time of installation of the auxiliary program 42, it is possible to generate the notification data based on the main body information, for instance, even though the communication environment between the PC 1 and the printer 2 is poor at the time of printer selection or when the print settings are changed. In the case where the main body information is obtained each time the print settings are changed, it is possible to obtain the latest main body information from the printer 2 and generate the notification data. However, when the main body information of the selected printer is obtained at the time of printer selection, it is possible to reduce the number of times and the load for the PC 1 to communicate with the printer compared with when the main body information is obtained each time the print settings are changed. Further, compared with when the main body information is obtained at the time of installation of the auxiliary program 42, it is more likely to accommodate to the changes in settings for the printer.

For instance, after the auxiliary program 42 is activated from the general-purpose printing program 41 and obtains the main body information when the printer is selected in A07 (see FIG. 2) (A08-A14), the auxiliary program 42 may generate the notification data (see A21) based on the print settings that have been received from the general-purpose printing program 41 in A08 and the main body information that has been stored in the memory 12 in A14. In this case, in A21, the auxiliary program 42 may generate the notification data in substantially the same manner as in C10 and C11 (see FIG. 5). The auxiliary program 42 may provide the generated notification data to the general-purpose printing program 41, thereby enabling the notification data to be displayed in the notification field 52 on the print setting screen D2 (see A22). Thereby, at the time of printer selection as well, the auxiliary program 42 enables the sheet characteristics for the feed tray set in the print settings obtained from the general-purpose printing program 41 to be displayed in the notification field 52 on the print setting screen D2. Thus, the user is allowed to promptly know the information about the sheet characteristics for the selected printer.

For instance, the respective notification images in FIGS. 6A to 6C are all just examples, and are not limited to the examples as illustrated.

The general-purpose printing program 41 may activate the auxiliary program 42 when the printer normally used is changed from another printer to the printer 2 via the OS 21 by a user operation after the print setting screen D2 is displayed by the general-purpose printing program 41. In this case as well, in substantially the same manner as when the printer 2 is selected, the auxiliary program 42 may perform the notification data generating process and provide the generated notification data to the general-purpose printing program 41.

In the aforementioned illustrative embodiment, only the printing operation has been described in detail as an operation by the auxiliary program 42. However, the auxiliary program 42 may have other additional roles. The program that executes the processes according to aspects of the present disclosure is not limited to the auxiliary program 42, but may be any program configured to receive an instruction from the OS 21 or the general-purpose printing program 41 when printing is performed using the general-purpose printing program 41. For instance, the program that executes the processes according to aspects of the present disclosure may be a print workflow application of which the specifications have been published by Microsoft Corporation.

The timing at which the auxiliary program 42 is executed is not limited to the example in the aforementioned illustrative embodiment. For instance, the auxiliary program 42 may be executed by a direct execution instruction from the OS 21, or may be a resident auxiliary program 42. When the auxiliary program 42 is resident, the auxiliary program 42 may perform the aforementioned operations in response to receipt of an execution instruction.

In an arbitrary flowchart disclosed in the aforementioned illustrative embodiment, a plurality of processes in any plurality of steps may be arbitrarily changed in execution order or may be executed in parallel, to such an extent that there is no inconsistency in the processing results.

The processes disclosed in the aforementioned illustrative embodiment may be performed by a single CPU, a plurality of CPUs, hardware such as an ASIC, or a combination thereof. The processes disclosed in the aforementioned illustrative embodiment may be achieved in various forms and aspects such as a method and a non-transitory computer-readable storage medium storing programs for performing the processes.

The following shows examples of associations between elements illustrated in the aforementioned illustrative embodiment(s) and modification(s), and elements claimed according to aspects of the present disclosure. For instance, the PC 1 may be an example of an "information processing device" according to aspects of the present disclosure. The CPU 11 may be an example of a "processor" according to aspects of the present disclosure. The memory 12 may be an example of a "non-transitory computer-readable storage medium" according to aspects of the present disclosure. The memory 12 may be an example of a "memory" according to aspects of the present disclosure. The printer 2 may be an example of a "printer" according to aspects of the present disclosure. The display 13*a* may be an example of a "display" according to aspects of the present disclosure. The auxiliary program 42 may be an example of "computer-readable instructions" according to aspects of the present disclosure. The auxiliary program 42 may be an example of a "support program" according to aspects of the present disclosure. The general-purpose printing program 41 may be an example of a "general-purpose printing program" according to aspects of the present disclosure. The information applications 43 may be an example of an "application program" according to aspects of the present disclosure.

What is claimed is:

1. A non-transitory computer-readable storage medium storing computer-readable instructions that are executable by a processor of an information processing device and compatible with a printer connected with the information processing device, the instructions supporting a general-purpose printing program incorporated in advance in an operating system of the information processing device, the instructions being configured to, when executed by the processor, cause the information processing device to perform:
    obtaining main body information stored in the printer, the printer having one or more feed trays and storing the main body information indicating sheet characteristics for each of the one or more feed trays;
    obtaining print settings from the general-purpose printing program, the general-purpose printing program being configured to handle data for displaying a print setting screen on the display, the print setting screen being configured to accept, as the print settings, specified values set for a plurality of settable items including items of sheet characteristics and an item of feed tray;
    generating notification data based on the obtained main body information, the notification data including sheet information indicating the sheet characteristics for a specified feed tray set in the obtained print settings; and
    providing the generated notification data to the general-purpose printing program, thereby enabling the notification data to be displayed on the print setting screen.

2. The non-transitory computer-readable storage medium according to claim 1,
    wherein the instructions are further configured to, when executed by the processor, cause the information processing device to, when a specified value set for the item of feed tray in the obtained print settings represents automatic selection of a feed tray from among the one or more feed trays of the printer, generate, in the generating, the notification data including the sheet information indicating the sheet characteristics for each of all the one or more feed trays indicated by the main body information.

3. The non-transitory computer-readable storage medium according to claim 1,
    wherein the one or more feed trays of the printer include a particular tray with no sheet characteristics set, and
    wherein the instructions are further configured to, when executed by the processor, cause the information processing device to, when the specified feed tray set in the obtained print settings is the particular tray, generate, in the generating, the notification data including predetermined notification contents.

4. The non-transitory computer-readable storage medium according to claim 1,
    wherein the instructions are further configured to, when executed by the processor, cause the information processing device to, based on the obtained main body information, generate, in the generating, the notification data including the sheet information indicating first sheet characteristics and second sheet characteristics, the first sheet characteristics being sheet characteristics for the specified feed tray set in the obtained print settings, the second sheet characteristics being sheet characteristics for one or more other feed trays than the specified feed tray set in the obtained print settings.

5. The non-transitory computer-readable storage medium according to claim 4,
    wherein the instructions are further configured to, when executed by the processor, cause the information processing device to, based on the obtained main body information, generate, in the generating, the notification data including the sheet information indicating the first sheet characteristics and the second sheet characteristics, the notification data being for providing a notification about the first sheet characteristics in preference to the second sheet characteristics.

6. The non-transitory computer-readable storage medium according to claim 1,
    wherein the instructions are further configured to, when executed by the processor, cause the information processing device to:
        in response to a request from the general-purpose printing program after the printer is selected, perform the obtaining of the main body information, and storing the obtained main body information in a memory; and
        perform, in the generating, reading out the main body information stored in the memory, and generating, based on the read main body information, the notification data including the sheet information indicating the sheet characteristics for the specified feed tray set in the obtained print settings.

7. The non-transitory computer-readable storage medium according to claim 6,
    wherein the instructions are further configured to, when executed by the processor, cause the information processing device to, after performing the obtaining of the main body information and storing the obtained main body information in the memory in response to the request from the general-purpose printing program after the printer is selected, perform the obtaining of the print settings, the generating of the notification data, and the providing of the generated notification data to the general-purpose printing program, thereby enabling the notification data to be displayed on the print setting screen.

8. The non-transitory computer-readable storage medium according to claim 1,
    wherein the instructions are further configured to, when executed by the processor, cause the information processing device to generate, in the generating, the notification data including error information indicating a sheet characteristics error, when specified sheet characteristics set in the obtained print settings are not the sheet characteristics for the specified feed tray set in the obtained print settings.

9. The non-transitory computer-readable storage medium according to claim 1,
    wherein the instructions are further configured to, when executed by the processor, cause the information processing device to perform, in response to a request from the general-purpose printing program after a print instruction to print a target image is output from an application program incorporated in the information processing device to the general-purpose printing program, obtaining image data representing the target image from the general-purpose printing program, and sending to the printer a print command based on the obtained image data.

10. A method implementable on a processor of an information processing device that executes a support program supporting a general-purpose printing program incorporated in advance in an operating system of the information processing device, the support program being compatible with a printer connected with the information processing device, the method comprising:

obtaining main body information stored in the printer, the printer having one or more feed trays and storing the main body information indicating sheet characteristics for each of the one or more feed trays;

obtaining print settings from the general-purpose printing program, the general-purpose printing program being configured to handle data for displaying the print setting screen on the display, the print setting screen being configured to accept, as the print settings, specified values set for a plurality of settable items including items of sheet characteristics and an item of feed tray;

generating notification data based on the obtained main body information, the notification data including sheet information indicating the sheet characteristics for a specified feed tray set in the obtained print settings; and providing the generated notification data to the general-purpose printing program, thereby enabling the notification data to be displayed on the print setting screen.

\* \* \* \* \*